US011661536B2

(12) United States Patent
Lewandowski et al.

(10) Patent No.: US 11,661,536 B2
(45) Date of Patent: May 30, 2023

(54) ADHESIVES COMPRISING POLYMERIZED UNITS OF SECONDARY HEXYL (METH)ACRYLATES

(71) Applicant: 3M INNOVATIVE PROPERTIES COMPANY, St. Paul, MN (US)

(72) Inventors: Kevin M. Lewandowski, Inver Grove Heights, MN (US); Ross E. Behling, Woodbury, MN (US); Jason D. Clapper, Lino Lakes, MN (US); Bryan T. Whiting, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 335 days.

(21) Appl. No.: 16/958,934

(22) PCT Filed: Feb. 26, 2019

(86) PCT No.: PCT/US2019/019482
§ 371 (c)(1),
(2) Date: Jun. 29, 2020

(87) PCT Pub. No.: WO2019/168805
PCT Pub. Date: Sep. 6, 2019

(65) Prior Publication Data
US 2020/0332160 A1 Oct. 22, 2020

Related U.S. Application Data

(60) Provisional application No. 62/636,492, filed on Feb. 28, 2018.

(51) Int. Cl.
| *C09J 133/08* | (2006.01) |
| *C09J 7/38* | (2018.01) |
| *C08F 220/18* | (2006.01) |
| *C08F 220/06* | (2006.01) |
| *C08F 220/20* | (2006.01) |
| *C09J 133/10* | (2006.01) |

(52) U.S. Cl.
CPC .......... *C09J 133/08* (2013.01); *C08F 220/06* (2013.01); *C08F 220/18* (2013.01); *C08F 220/1808* (2020.02); *C08F 220/1811* (2020.02); *C08F 220/20* (2013.01); *C09J 7/385* (2018.01); *C09J 133/10* (2013.01); C08F 220/1806 (2020.02)

(58) Field of Classification Search
CPC . C09J 133/08; C09J 133/10; C09J 7/38; C09J 7/381; C09J 7/385; C08F 220/1806; C08F 220/18
See application file for complete search history.

(56) References Cited

U.S. PATENT DOCUMENTS

| 2,884,126 | A | * | 4/1959 | Ulrich | .................. C09J 7/38 |
| | | | | | 526/318.2 |
| 3,691,140 | A | | 9/1972 | Silver | |
| 4,166,152 | A | | 8/1979 | Baker | |
| 4,455,205 | A | | 6/1984 | Olson | |
| 4,619,979 | A | | 10/1986 | Kotnour | |
| 4,636,432 | A | | 1/1987 | Shibano | |
| 4,656,218 | A | | 4/1987 | Kinoshita | |
| 4,843,134 | A | | 6/1989 | Kotnour | |
| 4,921,759 | A | | 5/1990 | Orain | |
| 5,001,192 | A | | 3/1991 | Sun | |
| 5,045,569 | A | | 9/1991 | Delgado | |
| 5,204,379 | A | * | 4/1993 | Kubota | ................ C08G 18/671 |
| | | | | | 428/423.1 |
| 5,602,221 | A | | 2/1997 | Bennett | |
| 5,637,646 | A | | 6/1997 | Ellis | |
| 5,804,610 | A | | 9/1998 | Hamer | |
| 6,245,833 | B1 | | 6/2001 | Kang | |
| 6,376,060 | B1 | | 4/2002 | Yoshihara | |
| 6,841,190 | B2 | | 1/2005 | Liu | |
| 7,101,616 | B2 | | 9/2006 | Arney | |
| 7,427,438 | B2 | | 9/2008 | Jones | |
| 7,491,441 | B2 | | 2/2009 | Pokorny | |
| 8,343,622 | B2 | | 1/2013 | Liu | |
| 9,016,858 | B2 | | 4/2015 | Zheng | |
| 9,102,774 | B2 | | 8/2015 | Clapper | |
| 9,676,960 | B2 | | 6/2017 | Kim | |
| 9,689,043 | B2 | | 6/2017 | Kim | |
| 9,706,649 | B2 | | 7/2017 | Jung | |
| 9,709,707 | B2 | | 7/2017 | Zheng | |
| 2009/0004478 | A1 | | 1/2009 | Baetzold | |
| 2012/0276369 | A1 | | 11/2012 | Jing | |
| 2013/0302594 | A1 | | 11/2013 | Sugiyama | |

(Continued)

FOREIGN PATENT DOCUMENTS

| CN | 101701146 | 5/2010 |
| CN | 101717618 | 6/2010 |

(Continued)

OTHER PUBLICATIONS

Dubois, J, Translation of WO-2010125276-A1 from Espacenet (Year: 2010).*
Yamada, S, Translation of JP-S6313464-B2 from PE2E Search (Year: 1988).*
Penzel, E., Ballard, N. and Asua, J.M. (2018). Polyacrylates. In Ullmann's Encyclopedia of Industrial Chemistry. Table 1 for homopolymer glass transition temperatures. (Year: 2018).*
Fujita, S, Translation of JP-2015044946 from PatentScope (Year: 2015).*
Hutchinson, J.M. (2009). Determination of the glass transition temperature. Journal of Thermal Analysis and Calorimetry, 98, 579-589. (Year: 2009).*

(Continued)

*Primary Examiner* — Kregg T Brooks
*Assistant Examiner* — David R. Foss
(74) *Attorney, Agent, or Firm* — Carolyn A. Fischer

(57) ABSTRACT

Pressure-sensitive adhesive compositions are described comprising polymerized units of (meth)acrylate monomer. Also described are articles comprising such pressure-sensitive adhesive composition.

10 Claims, No Drawings

(56) References Cited

U.S. PATENT DOCUMENTS

| | | | |
|---|---|---|---|
| 2014/0065417 A1* | 3/2014 | Higashi | C09J 4/06 |
| | | | 525/330.3 |
| 2015/0132583 A1 | 5/2015 | Pokorny | |
| 2016/0343969 A1 | 11/2016 | Zeng | |
| 2017/0165950 A1 | 6/2017 | Leatherdale | |
| 2017/0166750 A1 | 6/2017 | Pokorny | |
| 2017/0170416 A1 | 6/2017 | Johnson | |
| 2017/0179424 A1 | 6/2017 | Lee | |
| 2017/0233591 A1 | 8/2017 | Sugiyama | |

FOREIGN PATENT DOCUMENTS

| | | | | |
|---|---|---|---|---|
| CN | 101948637 | | 1/2011 | |
| CN | 102212342 | | 10/2011 | |
| EP | 2749609 A1 | * | 7/2014 | C08F 220/18 |
| JP | S6313464 B2 | * | 3/1988 | |
| JP | 2009270018 | | 11/2009 | |
| JP | 2015044946 A | * | 3/2015 | |
| JP | 2016157110 | | 9/2016 | |
| JP | 2017095659 A | * | 6/2017 | C09J 11/06 |
| KR | 20090073588 | | 7/2009 | |
| KR | 20140024562 | | 3/2014 | |
| KR | 20170103644 | | 9/2017 | |
| WO | WO-2010125276 A1 | * | 11/2010 | C07C 67/08 |
| WO | WO 2014-078115 | | 5/2014 | |
| WO | WO 2014-151179 | | 9/2014 | |
| WO | WO 2015-013387 | | 1/2015 | |
| WO | WO 2016-028542 | | 2/2016 | |
| WO | WO 2016-069097 | | 5/2016 | |
| WO | WO 2016-208785 | | 12/2016 | |
| WO | WO 2016-209916 | | 12/2016 | |
| WO | WO 2017-214105 | | 12/2017 | |
| WO | WO 2018-005833 | | 1/2018 | |

OTHER PUBLICATIONS

Kuusk, "Esterification of Acrylic Acid with Alkenes", Publication of the Academy of Sciences of the Estonian Soviet Republic, Chemistry, Geology, 1973, vol. 22, No. 4, pp. 312-316.

Kuusk, "Synthesis of surfactants based on secondary alkyl acrylates", Eesti NSV Teaduste Akadeemia Toimetised, Keemia, Geoloogia, 1977, vol. 26, No. 3, pp. 231-234.

Nabais, "Synthesis and characterization of co-polymers based on methyl methacrylate and 2-hexyl acrylate containing naphthopyrans for a light-sensitive contact lens", Journal of Biomaterials Science, Polymer Edition, Apr. 2012, vol. 22, No. (1-3), pp. 139-152.

Ndong Mebah, "A convenient use of polyphosphoric acid in the esterification reaction between (meth)acrylic acid and (cyclo)alkenes", New Journal of Chemistry, Jun. 1993, vol. 17, No. 12, pp. 835-841.

Pocius, Adhesion and Adhesive Technology, 288, (2012).

International Search Report for PCT International Application No. PCT/US2019/019482, dated May 24, 2019, 5 pages.

* cited by examiner

ADHESIVES COMPRISING POLYMERIZED UNITS OF SECONDARY HEXYL (METH)ACRYLATES

CROSS REFERENCE TO RELATED APPLICATIONS

This application is a national stage filing under 35 U.S.C. 371 of PCT/US2019/019482, filed Feb. 26, 2019, which claims the benefit of U.S. Application No. 62/636,492, filed Feb. 28, 2018, the disclosure of which is incorporated by reference in its/their entirety herein.

BACKGROUND

U.S. Pat. No. 9,102,774 describes polymers derived from secondary alkyl (meth)acrylates.

SUMMARY

In one embodiment, a pressure-sensitive adhesive composition is described comprising polymerized units of a secondary alkyl(meth)acrylate monomer having the following structure:

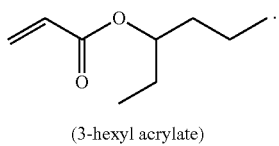

(3-hexyl acrylate)

In another embodiment, a (meth)acrylate polymer is described comprising polymerized units of a secondary alkyl(meth)acrylate monomer having the following structure:

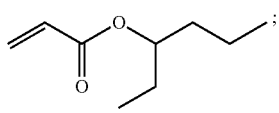

and
polymerized units of at least one monomer selected from
  i) a (meth)acrylic acid ester of a $C_1$-$C_{32}$ alkanol;
  ii) an acid-functional, ethylenically unsaturated monomer;
  iii) a non-acid-functional, ethylenically unsaturated polar monomer; and
  iv) a crosslinker.

In another embodiment, a pressure-sensitive adhesive composition is described comprising polymerized units of a secondary alkyl(meth)acrylate of Formula (I):

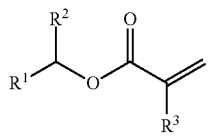

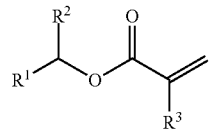

wherein: $R^1$ and $R^2$ are each independently a saturated linear alkyl group and the sum of the number of carbons in $R^1$ and $R^2$ is 5; and $R^3$ is H or $CH_3$.

DETAILED DESCRIPTION OF ILLUSTRATIVE EMBODIMENTS

In one embodiment, the present disclosure provides a polymer comprising polymerized units of a secondary alkyl (meth)acrylate of Formula (I):

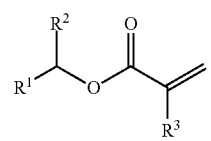

wherein:
$R^1$ and $R^2$ are each independently a saturated linear alkyl group and the sum of the number of carbons in $R^1$ and $R^2$ is 5; and $R^3$ is H or $CH_3$;
The polymer typically comprises polymerized units of two structural isomers of a moiety of Formula (II):

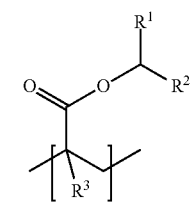

wherein $R^1$, $R^2$, and $R^3$ are as defined for Formula (I).
Typically, such structural isomers are 2-hexyl(meth)acrylate and 3-hexyl(meth)acrylate, and more typically the structural isomers are 2-hexyl acrylate and 3-hexyl acrylate, as depicted as follows:

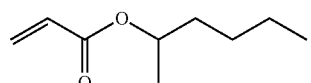

2-hexyl acrylate

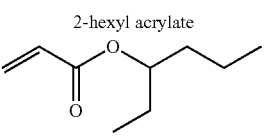

3-hexyl acrylate

Monofunctional, low Tg, acrylic monomers typically used in PSAs are predominantly derived from the esterification of a primary alkyl alcohol with (meth)acrylic acid resulting in a (meth)acrylic ester monomer. Alternatively, (meth)acrylate monomers of Formula (I) can be prepared using the reaction of a (meth)acrylic acid with an olefin having a single unsaturation (e.g., an alpha-olefin), resulting in a number of branched structural isomers, as the double bond of the olefin compound is able to migrate along the chain before the addition of the (meth)acrylic acid. For example, columns 7 and 8 of U.S. Pat. No. 9,102,774 describe the generation of dodecyl acrylate from both the secondary alcohol and dodecene (Scheme Ia and Scheme Ib), demonstrating the formation of a mixture of structural isomers in the latter case. This mixture of isomers in Scheme Ib results from isomerization of the double bond.

In the case of the generation of hexyl acrylate using the reaction of a (meth)acrylic acid with an olefin having a single unsaturation (e.g., an alpha-olefin), two structural isomers are present in the resulting mixture, as depicted in the following reaction scheme.

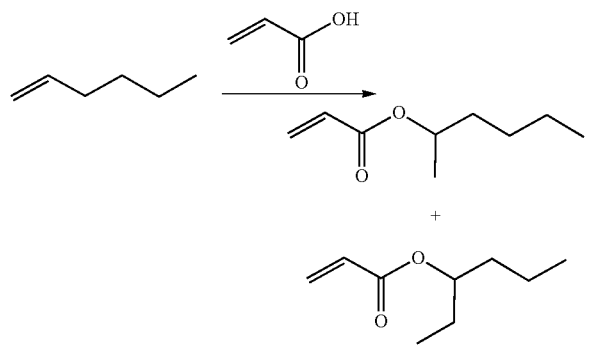

One advantage of this synthetic pathway is the generally lower cost of the olefin starting materials compared to similarly structured alkyl alcohols. Secondary alkyl alcohols can become more expensive than the corresponding alpha-olefin hexane (e.g. 1-hexene).

The olefin starting materials may be a single compound or mixtures of compounds such as those sold under the trade names NEODENE (Shell Chemicals) and ALPHAPLUS (Chevron Phillips Chemical Company), or recycled reactants from a previous reaction such as a mixture of 1-hexene, 2-hexene, and 3-hexene.

In one embodiment, a method for the production of secondary hexyl acrylates and secondary hexyl methacrylates is described. The method involves reacting (meth) acrylic acid with an olefin having a single unsaturation (e.g., an alpha-olefin) in the presence of a fluorinated sulfonic acid. An illustrative reaction scheme using 1-octene is depicted in Scheme II of U.S. Pat. No. 9,102,774.

Embodiments of this method are very economical and provide high purity products. Once a typical reaction reaches equilibrium, the yield can be increased by using an excess of either the acid or the olefin. The reagent used in excess, for example, can then be reclaimed and recycled. At low concentrations (e.g., no greater than about 5 mole percent), fluorinated sulfonic acids seem to be unique in the ability to allow this reaction to reach equilibrium at lower temperatures using shorter reaction times while reducing the formation of by-products.

Preferred fluorinated sulfonic acids are of the formula $R^4$—$(CF_2$—$SO_3H)_n$, wherein n is one or two, and $R^4$ is a fluorine (when n is 1), a carboxylic acid group (when n is 1), a $C_1$-$C_{12}$ alkyl group (when n is 1), a $C_1$-$C_{12}$ alkylene group (when n is 2), a fluorinated (preferably, perfluorinated) $C_1$-$C_{12}$ alkyl group (when n is 1), a fluorinated (preferably, perfluorinated) $C_1$-$C_{12}$ alkylene group (when n is 2), a perfluoroether $C_1$-$C_{12}$ heteroalkyl group (when n is 1), or a perfluoroether $C_1$-$C_{12}$ heteroalkylene group (when n is 2). Preferably, the sulfonic acid is perfluorinated. Examples of $R^4$ groups include $CF_3CF_2OCF_2$—, $CF_3CF_2OCF_2CF(CF_3)OCF_2$—, HO(O)C—, $CF_3$—, $C_3F_7$—, $C_4F_{11}$—, $C_7H_{15}$—, $CF_3CHF$—, —$CF_2$—O—$CF_2$—, —$(CF_2)_3OCF_2$—, —$(CF_2)_5OCF_2$—, and —$(CF_2)_7OCF_2$—. Examples of fluorinated sulfonic acids include trifluoromethanesulfonic acid, nonafluorobutane-1-sulfonic acid, $CF_3CF_2O(CF_2)_2SO_3H$, $CF_3CF_2OCF_2CF(CF_3)OCF_2CF_2SO_2H$, HO(O)CCF$_2$SO$_3$H, $C_2F_5SO_3H$, $C_4F_9SO_3H$, $C_6F_{13}SO_3H$, $C_8H_{17}SO_3H$, $CF_3CHFCF_2SO_3H$, $O(CF_2CF_2SO_3H)_2$, $HO_3S(CF_2)_4O(CF_2)_2SO_3H$, and $HO_3S(CF_2)_6O(CF_2)_2SO_3H$, $HO_3S(CF_2)_8O(CF_2)_2SO_3H$.

Another example of a fluorinated sulfonic acid is a sulfonated tetrafluoroethylene based fluoropolymer-copolymer available under the tradename NAFION NR50 (E.I. du Pont de Nemours), which has the general Formula (III):

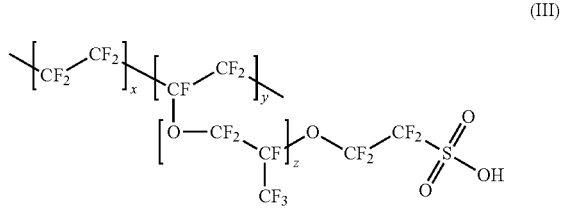

wherein x, y, and z are selected such that the sulfonic acid equivalent weight is less than or equal to 1250.

Although esterification of carboxylic acids with olefins using acid catalysis is known, with other acid catalysts typical conditions require temperatures of 100-220° C. and reaction times of 2-3 hours to reach equilibrium with generally low productions of the desired products (e.g., 45% conversion).

In some embodiments, the esterification of acrylic acid or methacrylic acid with an olefin can provide product yields (conversions) of at least 50%, at least 60%, or at least 70%. Significantly, because fewer undesired by-products are formed using the method of the present disclosure, unreacted starting materials can be reclaimed and recycled. Thus, even though these reactions don't go to completion because they reach an equilibrium mixture of reactants and products, if yields were calculated based on reactants consumed, reaction yields could be considered close to quantitative.

For the esterification of acrylic acid or methacrylic acid with an olefin as described herein, the temperature of the reaction and concentration of the fluorinated sulfonic acid can vary, depending on the desired reaction time to reach equilibrium. For example, if the reaction is carried out at a temperature of 90° C. when the fluorinated sulfonic acid concentration is at least 2 mole percent acid, equilibrium can be reached within 4 hours. If the temperature is lowered to 70° C. at 2 mole percent fluorinated sulfonic acid, equilibrium can be reached within 18 hours. Alternatively, equilibrium can be reached within 18 hours if the temperature is raised to 120° C. and the fluorinated sulfonic acid concentration is lowered to 0.1 mole percent. Higher fluorinated sulfonic acid concentrations and/or higher temperatures can get the reaction times down to less than 1 hour if desired. In the reaction of the present disclosure, a typical concentration of a fluorinated sulfonic acid is at least 0.01 mole percent, and often up to 10 mole percent acid. A typical temperature of reaction is at least 40° C., and often up to 150° C. It will be understood that the temperature of any one reaction can vary, e.g., a reaction can be held at a first temperature for a first period of time, and raised or lowered to a second temperature for a second period of time. A typical reaction time (to equilibrium) is at least 5 minutes, and often up to 48 hours.

When the esterification reaction is carried out with 1-hexene, only two secondary (meth)acrylate isomers are possible. Thus, the mixture of isomers comprises no 4-alkyl and 5-alkyl(meth)acrylate isomers, as described in U.S. Pat. No. 9,102,774. The relative amounts of the (meth)acrylate isomers may vary depending on the starting material(s) and reaction conditions used (such as temperature and catalyst concentration). The molar and weight ratio of 2-hexyl acrylate to 3-hexyl acrylate can vary from 1:10 to 10:1. In other words, the secondary alkyl(meth)acrylate monomer comprises at least 10 molar and weight percent of 2-hexyl acrylate in some embodiments. In other embodiments, the secondary alkyl(meth)acrylate monomer comprises at least 10 molar and weight percent of 3-hexyl acrylate. In some embodiments, the secondary alkyl(meth)acrylate monomer comprises at least 15, 20, 25, 30, 35, 40 or 50 molar or weight percent of 2-hexyl acrylate in some embodiments. In other embodiments, the secondary alkyl(meth)acrylate monomer comprises at least 15, 20, 25, 30, 35, 40 or 50 molar and weight percent of 3-hexyl acrylate in some embodiments. In some embodiments, the amount of 2-hexyl acrylate is equal to or greater than the amount of 3-hexyl acrylate. The molar and weight ratio of 2-hexyl acrylate to 3-hexyl acrylate is typically at least 1:1 and can range up to 1.5:2; 2:1; 2.5:1, 3:1, 3.5:1, or 4:1.

The alpha-olefin starting material may also be isomerized to a mixture of olefins prior to addition of (meth)acrylic acid by reaction with the acid catalyst. Typically, the catalyst used for this pre-isomerization process is the same as that used for the reaction between the olefin and (meth)acrylic acid. The temperature of the pre-isomerization process is typically 70-100° C. Often, an equal distribution of the internal isomers is obtained with only a small amount of the alpha-olefin. With this pre-isomerization process, the resultant secondary (meth)acrylate products are more equally distributed resulting in less of the 2-alkyl(meth)acrylate isomer and more internal (meth)acrylate isomers (such as 3-alkyl (meth)acrylates). Typically, the 2-alkyl(meth)acrylate isomer is less than 35 mole-% of the total mixture of alkyl(meth)acrylate isomers.

In the esterification of (meth)acrylic acid with an olefin, the amount of olefin and (meth)acrylic acid can vary as desired. As mentioned above, one reagent can be used in excess relative to the other to decrease the time of the reaction and increase the yield. If one of the reagents is less expensive than the other, the less expensive one would be the one typically chosen to be in excess.

The esterification of acrylic acid or methacrylic acid with an olefin as described herein is typically carried out neat, i.e., in the absence of solvent. If desired, however, solvents such as hexane, heptane, toluene, and xylenes can be used.

An alternative method of making the (meth)acrylate monomers of Formula (I) can be carried out by esterification of a mixture of secondary alcohols. The mixture of secondary alcohols can be prepared by blending individual secondary alcohols that have been prepared separately. Alternatively, the polymer of Formula (II) may be prepared by reaction of a poly(meth)acrylic acid (or poly(meth)acrylic acid-co-alkyl acrylate) with olefins using the methods described herein or with a mixture of secondary alcohols.

A continuous process may be used for the esterification of acrylic acid or methacrylic acid with an olefin (which may or may not have been pre-isomerized by contact with an acid catalyst). Herein, a "continuous" process is defined to be a process with continuous flow or semi-continuous flow (e.g., pulsed flow) of material(s) in and out of the reactor once the system is operating at steady state. Preferably, a "continuous" process uses a fixed-bed heterogeneous catalyst flow-through system. In a continuous process of this disclosure, a reactor, typically a tubular reactor, having an inlet for reactants and an outlet for products is charged with a fixed bed of solid acid catalyst and used to perform the desired chemical transformation(s). This reactor configuration, often described as a "packed-bed reactor," can be advantageous when compared to homogeneously catalyzed batch reactions for a number of reasons including: ease of reaction; tighter control over process variables (e.g., temperature, pressure and residence time); higher catalyst to reagent ratio (facilitating higher rates of reaction); and elimination of a catalyst filtration and/or neutralization step. As an alternative to using a packed-bed reactor configuration, other well known continuous reactor configurations may be employed such as "continuous stirred tank" reactors or "reactive distillation" reactors.

A wide variety of commercially available solid (typically, resin) acid catalysts may be used with a packed-bed reactor, for example, in a continuous process. In particular, solid acid (heterogeneous) catalysts may be advantageously used in performing the desired chemical transformation(s) disclosed herein including, but not limited to, high fluorine content aliphatic sulfonic acids (e.g., those available under the trade name NAFION) and sulfonated styrene divinylbenzene copolymers (e.g., those available under the trade name AMBERLYST). Selection of a suitable solid acid catalyst material is typically determined by cost, rate of reaction, and selectivity to desired products. One particular type of resin, macroreticular resin, is particularly preferred because it is inexpensive and available in a wide variety of different physical and/or chemical structures. Varying catalyst features such as catalyst surface area, porosity, and acidity can be tuned by varying resin properties such as the extent of crosslinking and degree of sulfonization, facilitating the selection of a suitable catalyst for each desired reaction. Selection of such features is within the skill of one skilled in the art.

In one exemplary continuous process, olefin and acid reactants (as described herein) are mixed prior to entering or upon entering the reaction zone, defined to be the volume in the tubular reactor occupied by the heterogeneous catalyst material. Time required to perform the desired reaction can vary, primarily due to catalyst type and temperature. Reactant residence time, defined as the catalyst void volume divided by the volumetric feed rate of the reactants, may be controlled, for example, by adjusting the total reactant feed rate to the reactor. Reactant residence time is typically held constant at values of at least 1 minute, and often at least 5 minutes. Reactant residence time is typically held constant at values of no greater than 120 minutes, and often no greater than 20 minutes. Reaction temperatures may be controlled with resistively heated insulating tape or by circulating heating oil from a temperature controlled bath, or other conventional methods. Typical reaction temperatures are at least 40° C., and often at least 50° C. Typical reaction temperatures are no greater than 150° C., and often at least 90° C. These temperatures produce single pass yields and selectivities in reasonable amounts of time. Reaction pressures may be controlled by a back pressure regulator placed at the outlet of the reactor unit, or other conventional methods. Typically, reaction pressures are no greater than 5 MPa, and often no greater than 1 MPa. These pressures will typically keep reagents in the liquid phase while reducing the need for specialized equipment that can withstand elevated pressures.

Whether in a continuous or batch process, after the reaction of the olefin and (meth)acrylic acid, the crude secondary (meth)acrylate product is typically purified. When an excess of olefin relative to (meth)acrylic acid is used in the reaction, the product is typically isolated by distillation to separate unreacted olefin and the secondary (meth)acrylate product. Alternatively, the crude reaction mixture can be first extracted with a basic aqueous solution (e.g., aqueous sodium bicarbonate) to remove any residual (meth)acrylic acid followed by distillation to isolate the secondary (meth)acrylate product.

During the reaction and subsequent purification procedures, a polymerization inhibitor is typically added. Suitable examples include, but are not limited to: hydroquinone (HQ); 4-methoxyphenol (MEHQ); 4-ethoxyphenol; 4-propoxyphenol; 4-butoxyphenol; 4-heptoxyphenol; hydroquinone monobenzylether; 1,2-dihydroxybenzene; 2-methoxyphenol; 2,5-dichlorohydroquinone; 2,5-di-tert-butylhydroquinone; 4-aminophenol; 2-aminophenol; 2-N,N-dimethylaminophenol; catechol monobutylether; 2,3-dihydroxyacetophenone; pyrogallol-1,2-dimethylether; t-butyl catechol; di-tertbutylnitroxide; di-tert-amylnitroxide; 2,2,6,6-tetramethylpiperidinyloxy; 4-hydroxy-2,2,6,6-tetramethyl-piperidinyloxy; 4-oxo-2,2,6,6-tetramethyl-piperidinyloxy; copper dimethyldithiocarbamate; copper salicylate; methylene blue; iron; phenothiazine; 3-oxophenothiazine; and 1,4-benzenediamine. The inhibitor or combination of inhibitors is typically added from 0.01 wt-% to 5.0 wt-%, based on the total volume of the reaction mixture.

In some embodiments, the polymer may be prepared from secondary hexyl(meth)acrylate monomer of Formula (I) in the absence of other comonomers. In this embodiment, the polymer may be characterized as a homopolymer.

In typical embodiments, the (e.g. pressure-sensitive adhesive) polymer further comprises polymerized units of other (e.g. monofunctional) comonomers to modify the physical properties of the polymer. In one aspect, the (e.g. pressure-sensitive adhesive) polymer includes the polymerized reaction product of: (a) a secondary hexyl(meth)acrylate of Formula (I); and at least one comonomer such as (b) a (meth)acrylic acid ester of a $C_1$-$C_{32}$ alkanol; (c) an acid-functional, ethylenically unsaturated monomer; (d) a non-acid-functional, ethylenically unsaturated polar monomer; (e) a vinyl monomer; and (f) a multifunctional (meth)acrylate. Various combination of such comonomers can be employed.

In some embodiments, the (e.g. pressure-sensitive adhesive) polymer comprises at least 1, 2, 3, 4, or 5 wt-% of polymerized units of secondary hexyl(meth)acrylate monomer. In this embodiment, the (e.g. pressure-sensitive adhesive) polymer typically comprises another low Tg monomer and/or additives such as tackifier and plasticizer such that the composition is a pressure sensitives adhesive. It has been found that small concentrations of secondary hexyl(meth)acrylate monomer can increase the peel adhesion (e.g. to stainless steel) in combination with providing shear adhesion (e.g. to stainless steel) greater than 10,000 minutes.

In other embodiments, the (e.g. pressure-sensitive adhesive) polymer comprises higher concentrations of polymerized units of secondary hexyl(meth)acrylate monomer. The concentration of polymerized units of secondary hexyl (meth)acrylate monomer may be at least 10, 15, 20, 25, 30, 35, 40, 45, 50, 55, 60, 65, 70, 75, 80, 85, 90, or 95 wt.-% of polymerized units of secondary hexyl(meth)acrylate monomer. It has been found that (e.g. pressure-sensitive adhesive) polymers comprising high concentrations of polymerized units of secondary hexyl(meth)acrylate monomer can exhibit a reduced dielectric constant related to linear (unbranched) hexyl acrylate and therefore can be used to adjust the dielectric properties. In some embodiments, a 4 mil thick layer of the (e.g. pressure-sensitive adhesive) polymer, as described herein has a dielectric constant of less than 4 at 1 MHz. In some embodiments, the dielectric constant is at least 1 or 2.

In some embodiments, the (e.g. pressure-sensitive adhesive) polymer comprises polymerized monomer units of a $C_1$-$C_{32}$ (meth)acrylate ester monomer (i.e., (meth)acrylic acid ester of a $C_1$-$C_{32}$ alkanol). These are typically distinct monomers from the compounds of Formula (I). In some embodiments, these are $C_1$-$C_{24}$, $C_1$-$C_{18}$, or $C_1$-$C_{12}$ (meth)acrylate ester monomers. Examples of monomers suitable for use as the $C_1$-$C_{32}$ (meth)acrylate ester monomer include an ester of either acrylic acid or methacrylic acid with a non-tertiary alkanol such as ethanol, 1-propanol, 2-propanol, 1-butanol, 2-butanol, 1-pentanol, 2-pentanol, 3-pentanol, 2-methyl-1-butanol, 3-methyl-1-butanol, 1-hexanol, 2-hexanol, 2-methyl-1-pentanol, 3-methyl-1-pentanol, 2-ethyl-1-butanol, 3,5,5-trimethyl-1-hexanol, 3-heptanol, 1-octanol, 2-octanol, isooctylalcohol, 2-ethyl-1-hexanol, 1-decanol, 2-propylheptanol, 1-dodecanol, 1-tridecanol, 1-tetradecanol, citronellol, dihydrocitronellol, and the like. In some embodiments, the preferred (meth)acrylate ester monomer is the ester of (meth)acrylic acid with butyl alcohol or isooctyl alcohol, or a combination thereof, although combinations of two or more different (meth)acrylate ester monomers are suitable.

In some embodiments it is desirable for the $C_1$-$C_{32}$ (meth)acrylate ester monomer to include a high Tg monomer, having a homopolymer Tg of at least 25° C., and preferably at least 50° C. Examples of suitable high Tg monomers useful in the present disclosure include, but are not limited to, t-butyl acrylate, methyl methacrylate, ethyl methacrylate, isopropyl methacrylate, n-butyl methacrylate, isobutyl methacrylate, s-butyl methacrylate, t-butyl methacrylate, stearyl methacrylate, phenyl methacrylate, cyclohexyl methacrylate, isobornyl acrylate, isobornyl methacrylate, benzyl methacrylate, 3,3,5-trimethylcyclohexyl acrylate, cyclohexyl acrylate, propyl methacrylate, and combinations thereof.

In some embodiments it is desirable for the $C_1$-$C_{32}$ (meth)acrylate ester monomer to include a low Tg monomer, having a homopolymer Tg less than 25° C., and preferably less than 0° C. In some embodiments, the low Tg monomer has a $T_g$ no greater than −5° C., or no greater than −10° C. The Tg of these homopolymers is often greater than or equal to −80° C., greater than or equal to −70° C., greater than or equal to −60° C., or greater than or equal to −50° C.

Exemplary low Tg monomers include for example ethyl acrylate, n-propyl acrylate, n-butyl acrylate, isobutyl acrylate, n-pentyl acrylate, isoamyl acrylate, n-hexyl acrylate, 2-methylbutyl acrylate, 2-ethylhexyl acrylate, 4-methyl-2-pentyl acrylate, n-octyl acrylate, 2-octyl acrylate, isooctyl acrylate (Tg=−70° C.), isononyl acrylate, decyl acrylate, isodecyl acrylate, lauryl acrylate, isotridecyl acrylate, octadecyl acrylate, and dodecyl acrylate.

In some embodiments, the (e.g. pressure-sensitive adhesive) polymer comprises polymerized units of at least one low Tg monomer(s) having an alkyl group with 6 to 20 carbon atoms. In some embodiments, the low Tg monomer has an alkyl group with 7 or 8 carbon atoms. Exemplary monomers include, but are not limited to, 2-ethylhexyl (meth)acrylate, isooctyl(meth)acrylate, n-octyl(meth)acrylate, 2-octyl(meth)acrylate, isodecyl(meth)acrylate, and lauryl(meth)acrylate.

In some embodiments, the (e.g. pressure-sensitive adhesive) polymer comprises polymerized units of at least one low Tg monomer(s) that comprises a mixture of structural isomers of a secondary alkyl(meth)acrylate monomer that are not secondary hexyl(meth)acrylate monomers, as described in U.S. Pat. No. 9,102,774; incorporated herein by reference. Such secondary alkyl(meth)acrylate monomer can be characterized according to Formula (I) described above, wherein $R^1$ and $R^2$ are each independently a $C_1$ to $C_{30}$ saturated linear alkyl group and the sum of the number of carbons in $R^1$ and $R^2$ is 7 to 31; and $R^3$ is H or $CH_3$. In some embodiments, the sum of the number of carbons in $R^1$ and $R^2$ is no greater than 11.

In some embodiments, polymerized units of (e.g. low and/or high Tg) $C_1$-$C_{32}$ (meth)acrylate ester monomer(s) are present in an amount of at least 1, 2, 3, 4, or 5 wt.-%, based on the total weight of the polymer. In some embodiments, (e.g. low and/or high Tg) polymerized units of $C_1$-$C_{32}$ (meth)acrylate ester monomer(s) are present in an amount or at least 10, 15, or 20 wt.-%, based on the total weight of the polymer. In some embodiments, the polymerized units of (e.g. low and/or high Tg) $C_1$-$C_{32}$ (meth)acrylate ester monomer(s) are present in an amount of at least 10, 15, 20, 25, 30, 35, 40, 45, 50, 55, 60, 65, 70, 75, 80, 85 or 95 wt.-% based on the total weight of the polymer. In some embodiments, the polymerized units of low Tg $C_1$-$C_{32}$ (meth)acrylate ester monomer(s) in combination with the polymerized units of secondary hexyl(meth)acrylate are of a sufficient concentration such that the resulting acrylic polymer in the absence of additives (e.g. tackifier, plasticizer) is a pressure sensitive adhesive according to the Dahlquist criteria. Such low Tg $C_1$-$C_{32}$ (meth)acrylate ester monomer(s) can include other secondary alkyl(meth)acrylate monomer that are not secondary hexyl(meth)acrylate monomers, as described in U.S. Pat. No. 9,102,774.

In some embodiments the ratio of secondary hexyl(meth)acrylate to other secondary alkyl(meth)acrylate monomer ranges from 10:1 to 1:10. In some embodiments, the ratio of secondary hexyl(meth)acrylate to other secondary alkyl (meth)acrylate is at least 1:9, 1:8, 1:7, 1:6, 1:5, or 1:4. It has been found that relatively small concentrations of secondary hexyl(meth)acrylate can improve peel adhesion (e.g. to stainless steel), especially compared to linear (unbranched) hexyl acrylate.

The (e.g. pressure-sensitive adhesive) polymer, may further include polymerized units of an acid-functional monomer, wherein the acid-functional group may be an acid per se, such as a carboxylic acid, or a portion may be salt thereof, such as an alkali metal carboxylate. Useful acid-functional monomers include, but are not limited to, those selected from an ethylenically unsaturated carboxylic acid, ethylenically unsaturated sulfonic acid, ethylenically unsaturated phosphonic acid, and mixtures thereof. Examples of such compounds include those selected from acrylic acid, methacrylic acid, itaconic acid, fumaric acid, crotonic acid, citraconic acid, maleic acid, oleic acid, β-carboxyethyl(meth)acrylate, 2-sulfoethyl methacrylate, styrene sulfonic acid, 2-acrylamido-2-methylpropanesulfonic acid, vinylphosphonic acid, and mixtures thereof.

Due to their availability, an acid-functional monomer is generally selected from ethylenically unsaturated carboxylic acids (i.e., (meth)acrylic acids). When even stronger acids are desired, acidic monomers can include the ethylenically unsaturated sulfonic acids and ethylenically unsaturated phosphonic acids.

When present, the (e.g. pressure sensitive adhesive) polymer typically comprises polymerized units of an acid-functional, ethylenically unsaturated monomer(s) in an amount of at least 0.5, 1, 1.5, 2, 2.5, 3, 2.5, 4, 4.5, or 5 wt.-%, based on the total weight of the polymer. In some embodiments, the (e.g. pressure sensitive adhesive) polymer comprises polymerized units of an acid-functional, ethylenically unsaturated monomer(s) in an amount of up to 10, 15, or 20 wt.-%, based on the total weight of the polymer.

The (e.g. pressure sensitive adhesive) polymers may further comprise polymerized units of a polar monomer. As used herein, the term "polar monomer" is exclusive of acid-functionality and is referred to as a "non-acid-functional, ethylenically unsaturated polar monomer."

Representative examples of suitable such polar monomers include, but are not limited to, 2-hydroxyethyl(meth)acrylate; 4-hydroxybutyl(meth)acrylate; N-vinylpyrrolidone; N-vinylcaprolactam; acrylamide; mono- or di-N-alkyl substituted acrylamide; t-butyl acrylamide; dimethylaminoethyl acrylamide; N-octyl acrylamide; a poly(alkoxyalkyl) (meth)acrylate including 2-(2-ethoxyethoxy)ethyl(meth)acrylate, 2-ethoxyethyl(meth)acrylate, 2-methoxyethoxyethyl(meth)acrylate, 2-methoxyethyl methacrylate, and a polyethylene glycol mono(meth)acrylate; an alkyl vinyl ether, including vinyl methyl ether; and mixtures thereof. Preferred polar monomers include those selected from the group consisting of 2-hydroxyethyl(meth)acrylate, N-vinylpyrrolidinone, and mixtures thereof.

When present, the (e.g. pressure sensitive adhesive) polymer typically comprises polymerized units of a non-acid ethylenically unsaturated polar monomer(s) in an amount of at least 0.5, 1, 1.5, 2, 2.5, 3, 2.5, 4, 4.5, or 5 wt.-%, based on the total weight of the polymer. In some embodiments, the (e.g. pressure sensitive adhesive) polymer comprises polymerized units of a non-acid ethylenically unsaturated polar monomer(s) in an amount of up to 10 wt.-%, based on the total weight of the polymer.

The composition used to form the polymers, particularly the pressure-sensitive adhesive polymers, of the present disclosure may further include one or more other vinyl monomers. When used, vinyl monomers useful in the (meth)acrylate polymer include a vinyl ester (e.g., vinyl acetate and vinyl propionate), styrene, substituted styrene (e.g., α-methyl styrene), vinyl halide, and mixtures thereof. As used herein vinyl monomers are exclusive of acid-functional monomers, acrylate ester monomers, and polar monomers.

When present, the (e.g. pressure sensitive adhesive) polymer typically comprises polymerized units of vinyl monomer(s) in an amount of at least 0.5 or 1 ranging up to 5 wt.-%, based on the total weight of the polymer.

There are several crosslinking mechanisms for acrylic polymers (particularly, adhesives) including free-radical copolymerization of multifunctional, ethylenically unsaturated groups with the other monomers, and covalent or ionic crosslinking through the functional monomers, such as acrylic acid. Another method is the use of UV crosslinkers, such as copolymerizable benzophenones or post-added photocrosslinkers, such as multifunctional benzophenones and triazines. In the past, a variety of different materials have been used as crosslinking agents, e.g., polyfunctional acrylates, acetophenones, benzophenones, and triazines. Crosslinking may also be achieved using high energy electromagnetic radiation such as gamma or e-beam radiation. In this case, no additional crosslinker may be required. One or more of these mechanisms can be used with the polymers described herein.

In order to increase cohesive strength of the coated (particularly, adhesive) composition, a multifunctional (meth)acrylate may be incorporated into the blend of polymerizable monomers. A multifunctional (meth)acrylate is particularly useful for emulsion or syrup polymerization. Examples of a useful multifunctional (meth)acrylate include, but are not limited to, a di(meth)acrylate, tri(meth) acrylate, and tetra(meth)acrylate, such as 1,6-hexanediol di(meth)acrylate, a poly(ethylene glycol) di(meth)acrylate, polybutadiene di(meth)acrylate, a polyurethane di(meth) acrylate, propoxylated glycerin tri(meth)acrylate, and mixtures thereof.

When present, the (e.g. pressure sensitive adhesive) polymer typically comprises polymerized units of multifunctional (meth)acrylate monomer(s) in an amount of at least 0.01, 0.02, 0.03, 0.04, or 0.05 ranging up to 1, 2, 3, 4, or 5 wt.-%, based on the total weight of the polymer.

The (e.g. pressure-sensitive adhesive) polymers, described herein may be prepared by a variety of conventional free radical polymerization methods, including solution, radiation, bulk, dispersion, emulsion, and suspension processes. The monomer mixture may comprise a polymerization initiator, especially a thermal initiator or a photoinitiator of a type and in an amount effective to polymerize the monomers, as described below. For optical applications, solution, UV, and bulk processes are preferred. Other processes may introduce birefringence or foreign materials that may affect optic properties. The resulting adhesive copolymers of the present disclosure may be random or block copolymers.

The polymers may be prepared via suspension polymerizations as disclosed in U.S. Pat. No. 3,691,140 (Silver); U.S. Pat. No. 4,166,152 (Baker et al.); U.S. Pat. No. 4,636,432 (Shibano et al); U.S. Pat. No. 4,656,218 (Kinoshita); and U.S. Pat. No. 5,045,569 (Delgado).

Initiators useful in preparing the (meth)acrylate polymers of the present disclosure are initiators that, on exposure to heat, generate free-radicals which initiate (co)polymerization of the monomer mixture. Suitable initiators include, but are not limited to, those selected from the group consisting of potassium persulfate, ammonium persulfate, sodium persulfate, and mixtures thereof; an oxidation-reduction initiator such as the reaction product of an above-mentioned persulfate and a reducing agent such as those selected from the group consisting of sodium metabisulfite and sodium bisulfite; and 4,4'-azobis(4-cyanopentanoic acid) and its soluble salts (e.g., sodium, potassium). The preferred water-soluble initiator is potassium persulfate. Suitable oil-soluble initiators include, but are not limited to, those selected from the group consisting of an azo compound such as VAZO 64 (2,2'-azobis(isobutyronitrile)) and VAZO 52 (2,2'-azobis(2,4-dimethylpentanenitrile)) (both available from E.I. du Pont de Nemours Co.), peroxides such as benzoyl peroxide and lauroyl peroxide, and mixtures thereof. The preferred oil-soluble thermal initiator is (2,2'-azobis(isobutyronitrile)). When used, initiators may be included in an amount up to 1 parts by weight, preferably from 0.05 to 1 parts by weight, more preferably 0.1 to 0.5 parts by weight, relative to 100 parts by weight of total monomer.

The polymerizable mixture may optionally further comprise chain transfer agents to control the molecular weight of the resultant polymer. Examples of useful chain transfer agents include, but are not limited to, those selected from the group consisting of carbon tetrabromide, alcohols, mercaptans, and mixtures thereof. When present, the preferred chain transfer agents are isooctylthioglycolate, tertiary dodecyl mercaptan, and carbon tetrabromide. If used, the polymerizable mixture may include up to 1 parts by weight of a chain transfer agent, typically 0.01 parts by weight to 0.5 parts by weight, and more typically 0.05 parts by weight to 0.2 parts by weight, relative to 100 parts by weight of the total monomer.

A typical solution polymerization method is carried out by adding the monomers, a suitable solvent, and an optional chain transfer agent to a reaction vessel, adding a free radical initiator, purging with nitrogen, and maintaining the reaction vessel at an elevated temperature, typically in the range of 40 to 100° C. until the reaction is completed, typically in 1 to 20 hours, depending upon the batch size and temperature. Examples of the solvent are methanol, tetrahydrofuran, ethanol, isopropanol, acetone, methyl ethyl ketone, methyl acetate, ethyl acetate, toluene, xylene, and ethylene glycol alkyl ether. Those solvents can be used alone or as mixtures thereof.

In a typical photopolymerization method, a monomer mixture may be irradiated with ultraviolet (UV) rays in the presence of a photopolymerization initiator (i.e., photoinitiators). Preferred photoinitiators are those available under the trade designations OMNIRAD from IGM Resins, USA and include 1-hydroxy cyclohexyl phenyl ketone (OMNIRAD 184), 2,2-dimethoxy-1,2-diphenylethan-1-one (OMNIRAD 651), bis(2,4,6-trimethylbenzoyl)phenylphosphineoxide (OMNIRAD 819), 1-[4-(2-hydroxyethoxy)phenyl]-2-hydroxy-2-methyl-1-propane-1-one (OMNIRAD 2959), 2-benzyl-2-dimethylamino-1-(4-morpholinophenyl)butanone (OMNIRAD 369), 2-methyl-1-[4-(methylthio)phenyl]-2-morpholinopropan-1-one (OMNIRAD 907), and 2-hydroxy-2-methyl-1-phenyl propan-1-one (OMNIRAD 1173). Particularly preferred photoinitiators are OMNIRAD 819, 651, 184 and 2959.

Solventless polymerization methods may also be utilized to prepare the polymers, such as the continuous free radical polymerization method described in U.S. Pat. No. 4,619,979 (Kotnour et al.) and U.S. Pat. No. 4,843,134 (Kotnour et al.), the essentially adiabatic polymerization methods using a batch reactor described in U.S. Pat. No. 5,637,646 (Ellis), and the methods described for polymerizing packaged pre-adhesive compositions described in U.S. Pat. No. 5,804,610 (Hamer et al.).

The molecular weight of the (e.g. pressure-sensitive adhesive) polymer can vary depending on the polymerization technique. In some embodiments, the (e.g. solution polymerized) polymer has a weight average molecular weight (Mw) of at least 100,000; 150,000, or 200,000 Daltons. In some embodiments, the weight average molecular weight (Mw) is no greater than 1,000,000; 750,000, or 500,000 Daltons. The molecular weight of the polymer can be increased by chemical or radiant energy crosslinking.

In one embodiment, a method of making a (e.g. pressure-sensitive adhesive) polymer is described comprising providing a composition comprising a polymer comprising polymerized units of a secondary hexyl(meth)acrylate and optionally other polymerized units and/or additives as described herein; coating the composition onto a substrate; and crosslinking the polymer by exposure to radiant (e.g. electron beam) energy.

The "Dahlquist Criterion for Tack" is widely recognized as a necessary condition of a pressure sensitive adhesives (PSA). It states that a PSA has a shear storage modulus (G') of less than $3 \times 10^6$ dyne/cm$^2$ (0.3 MPa) at approximately room temperature (25° C.) and a frequency of 1 Hz (Pocius, Adhesion and Adhesive Technology 3$^{rd}$ Ed., 2012, p. 288). In typical embodiments, the polymer comprising polymerized units of secondary hexyl(meth)acrylate and optional comonomers is a pressure sensitive adhesive according to the Dahlquist criterion.

The (e.g. pressure-sensitive adhesive) polymer may be combined with one or more conventional additives. Preferred additives include tackifiers, plasticizers, dyes, antioxidants, and UV stabilizers. Such additives can be used if they do not affect the superior properties of the pressure-sensitive adhesives, for example. In some embodiments, the polymer comprising polymerized units of secondary hexyl (meth)acrylate and optional comonomers has a shear storage modulus greater than the Dahlquist criterion and the inclusion of additives (e.g. tackifier and/or plasticizers) renders the composition a pressure sensitive adhesive.

Conventional (meth)acrylic-based adhesives do not adhere well to certain substrates, such as certain types of automotive paints and low energy olefinic surfaces. Efforts have been made to improve the adhesion of (meth)acrylic-based adhesives, i.e., develop more aggressive tack, to these types of surfaces; tackifying the base acrylic polymer is commonly practiced. The tackifier is generally selected to be miscible with the (meth)acrylate polymer used to form the PSA. Suitable tackifying resins include rosins and their derivatives (e.g., rosin esters); polyterpenes and aromatic-modified polyterpene resins; coumarone-indene resins; and hydrocarbon resins such as alpha pinene-based resins, beta pinene-based resins, limonene-based resins, aliphatic hydrocarbon-based resins, aromatic-modified hydrocarbon-based resins, aromatic hydrocarbon resins, and dicyclopentadiene-based resins. In certain embodiments, the tackifier is a terpene resin, a hydrocarbon resin, a rosin resin, a petroleum resin, or combination thereof. Combinations of various tackifiers can be used if desired. These tackifying resins, if desired, can be hydrogenated to lower their color contribution to the pressure-sensitive adhesive layer.

Various types of tackifiers include phenol modified terpenes and rosin esters such as glycerol esters of rosin and pentaerythritol esters of rosin that are available under the trade names NUROZ, NUTAC (Newport Industries), PERMALYN, STAYBELITE, FORAL (Eastman). Also available are hydrocarbon resin tackifiers that typically come from C5 and C9 monomers by products of naphtha cracking and are available under the trade names PICCOTAC, EASTOTAC, REGALREZ, REGALITE (Eastman), ARKON (Arakawa), NORSOLENE, WINGTACK (Cray Valley), NEVTAC LX (Neville Chemical Co.), HIKOTACK, HIKOREZ (Kolon Chemical), NOVARES (Ruetgers N.V.), QUINTONE (Zeon), ESCOREZ (Exxon Mobile Chemical), NURES, nd H-REZ (Newport Industries).

Losses in clarity and stability of tackified (meth)acrylic-based adhesives, and other deleterious effects can be observed when tackifiers are present during bulk acrylic polymerization reactions. Depending on the structure of the tackifier, undesirable effects of adding a tackifier include the inhibition or retardation of the polymerization reaction and/or the alteration of the final polymer structure if the tackifier acts as a chain-transfer or chain-terminating agent. Such effects can adversely influence the performance and stability of acrylates polymerized in the presence of these tackifiers. Chain termination can also result in undesirably high residual volatile materials. In some embodiments, the pressure sensitive adhesive comprises little or no tackifier. In this embodiment, the amount of tackifier is zero or less than 10, 9, 8, 7, 6, 5, 4, 3, 2, or 1 wt. % of the adhesive composition.

The (e.g. pressure sensitive) polymer compositions may be coated upon a variety of flexible and inflexible backing materials using, for example, conventional coating techniques to produce adhesive-coated materials. Flexible substrates are defined herein as any material that is conventionally utilized as a tape backing or may be of any other flexible material. Examples include, but are not limited to, paper stock including crepe paper as well as plastic films such as polypropylene, polyethylene, polyvinyl chloride, polyester (polyethylene terephthalate), other polyesters (such as polyethylene naphthalate), polycarbonate, polymethyl(meth) acrylate (PMMA), cellulose acetate, cellulose triacetate, and ethyl cellulose. Foam backings may be used. Examples of inflexible substrates include, but are not limited to, metal, metallized polymeric film, indium tin oxide coated glass and polyester, PMMA plate, polycarbonate plate, glass, or ceramic sheet material. The adhesive-coated sheet materials may take the form of any article conventionally known to be utilized with adhesive compositions such as labels, tapes, signs, covers, marking indices, display components, touch panels, and the like. Flexible backing materials having microreplicated surfaces are also contemplated.

The above-described compositions are coated on a substrate using conventional coating techniques modified as appropriate to the particular substrate. For example, these compositions can be applied to a variety of solid substrates by methods such as roller coating, flow coating, dip coating, spin coating, spray coating knife coating, and die coating. These various methods of coating allow the compositions to be placed on the substrate at variable thicknesses thus allowing a wider range of use of the compositions. Coating thicknesses may vary, but coating thicknesses of 2-500 microns (dry thickness), preferably 25 to 250 microns, are contemplated.

The substrate is selected depending on the particular application in which it is to be used. For example, the adhesive can be applied to sheeting products (e.g., decorative graphics and reflective products), label stock, and tape backings. Additionally, the adhesive may be applied directly onto a substrate such as an automotive panel, or a glass window so that another substrate or object can be attached to the panel or window.

The adhesive can also be provided in the form of a pressure-sensitive adhesive transfer tape in which at least one layer of the adhesive is disposed on a release liner for application to a permanent substrate at a later time. The adhesive can also be provided as a single coated or double coated tape in which the adhesive is disposed on a permanent backing. Backings can be made from plastics (e.g., polypropylene, including biaxially oriented polypropylene, vinyl, polyethylene, polyester such as polyethylene terephthalate), nonwovens (e.g., papers, cloths, nonwoven scrims), metal foils, foams (e.g., polyacrylic, polyethylene, polyurethane, neoprene), and the like. Foams are commercially available from various suppliers such as 3M Co., Voltek, Sekisui, and others. The foam may be formed as a coextruded sheet with the adhesive on one or both sides of the foam, or the adhesive may be laminated to it. When the adhesive is laminated to a foam, it may be desirable to treat the surface to improve the adhesion of the adhesive to the foam or to any of the other types of backings. Such treatments are typically selected based on the nature of the materials of the adhesive and of the foam or backing and include primers and surface modifications (e.g., corona treatment, surface abrasion). Additional tape constructions include those described in U.S. Pat. No. 5,602,221 (Bennett et al.).

For a single-sided tape, the side of the backing surface opposite that where the adhesive is disposed is typically coated with a suitable release material. Release materials are known and include materials such as, for example, silicone, polyethylene, polycarbamate, polyacrylics, and the like. For double coated tapes, another layer of adhesive is disposed on the backing surface opposite that where the adhesive of the disclosure is disposed. The other layer of adhesive can be different from the adhesive of the disclosure, e.g., a conventional (meth)acrylic ester PSA, or it can be the same adhesive as the disclosure, with the same or a different formulation. Double coated tapes are typically carried on a release liner.

In some embodiments, a (e.g. 4) mil layer of the pressure sensitive adhesive composition described herein exhibits a peel adhesion force to stainless steel (SS) (as determined according to the test method described in the examples) of at least 5, 6, 7, 8, 9, or 10 N/dm. The peel adhesion force to stainless steel can range up to 20, 25, 30, 35, 40 N/dm or greater.

In some embodiments, a (e.g. 4) mil layer of the pressure sensitive adhesive composition described herein exhibits a shear adhesion force to stainless steel (as determined according to the test method described in the examples) of 10,000+ minutes. In other embodiments, wherein high shear adhesion force is not of importance the shear adhesion force to stainless steel may be less than 10,000 minutes. For example, the shear adhesion force may be at least 500, 1000, 2000, 3000, 4000, 5000, 6000, or 7000.

As used herein the term "(meth)acrylic" or "(meth)acrylate" is inclusive of both acrylic and methacrylic (or acrylate and methacrylate).

As used herein "$C_1$-$C_{32}$ alkanol (meth)acrylate" refers to a (meth)acrylate ester of a $C_1$-$C_{32}$ alkanol.

The term "aliphatic group" means a saturated or unsaturated linear or branched hydrocarbon group. This term is used to encompass alkyl, alkenyl, and alkynyl groups, for example.

The term "alkyl group" means a saturated linear or branched hydrocarbon group including, for example, methyl, ethyl, isopropyl, t-butyl, heptyl, dodecyl, octadecyl, amyl, 2-ethylhexyl, and the like.

The term "alkylene group" refers to a divalent alkyl group.

The term "heteroalkyl group" means an alkyl group having at least one —$CH_2$— replaced with a heteroatom such as O or S. In many embodiments, the heteroalkyl group is a monovalent polyether group. The term "heteroalkylene group" refers to a divalent heteroalkyl group. In many embodiments, the heteroalkylene group is a divalent polyether group.

The term "alicyclic group" means a cyclic hydrocarbon group having properties resembling those of aliphatic groups. The term "aromatic group" or "aryl group" means a mono- or polynuclear aromatic hydrocarbon group.

When a group is present more than once in a formula described herein, each group is "independently" selected, whether specifically stated or not. For example, when more than one R group is present in a formula, each R group is independently selected.

The terms "comprises" and variations thereof do not have a limiting meaning where these terms appear in the description and claims.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

As used herein, "a," "an," "the," "at least one," and "one or more" are used interchangeably.

As used herein, the term "or" is generally employed in its usual sense including "and/or" unless the content clearly dictates otherwise. The term "and/or" means one or all of the listed elements or a combination of any two or more of the listed elements.

All numbers are herein assumed to be modified by the term "about" and preferably with the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used. The recitation of numerical ranges by endpoints includes all numbers subsumed within that range (e.g., 1 to 5 includes 1, 1.5, 2, 2.75, 3, 3.80, 4, and 5). All parts recited herein, including those in the Example section below, are by weight unless otherwise indicated.

The complete disclosures of the patents, patent documents, and publications cited herein are incorporated by reference in their entirety as if each were individually incorporated. Various modifications and alterations to this disclosure will become apparent to those skilled in the art without departing from the scope and spirit of this disclosure. It should be understood that this disclosure is not intended to be unduly limited by the illustrative embodiments and examples set forth herein and that such examples and embodiments are presented by way of example only with the scope of the disclosure

EXAMPLES

Materials

The materials with their sources were as listed in Table 1. Unless stated otherwise, all other reagents were obtained, or are available from fine chemical vendors such as Sigma-Aldrich Company, St. Louis, Mo., or may be synthesized by known methods.

TABLE 1

Materials List

| Designation | Description | Supplier |
| --- | --- | --- |
| HA | n-hexyl acrylate, a monomer | Sigma-Aldrich (St. Louis, MO, USA) |
| IBOA | isobornyl acrylate, a monomer | Sigma-Aldrich (St. Louis, MO, USA) |
| EHA | 2-ethyl hexyl acrylate, a monomer | BASF (Charlotte, NC, USA) |
| HBA | 4-hydroxybutyl acrylate, a monomer | Tokyo Chemical Industry Co., LTD (TCI) (Tokyo, Japan) |
| C12 Acrylate | Dodecyl acrylate isomer blend | 3M Company, St. Paul, MN, and prepared as described in U.S. Pat. No. 9,102,774 (Clapper et al.) |

TABLE 1-continued

Materials List

| Designation | Description | Supplier |
|---|---|---|
| HEA | hydroxyethyl acrylate, a monomer | Kowa American Corporation (New York, NY, USA) |
| AA | acrylic acid, a monomer | Sigma-Aldrich (St. Louis, MO, USA) |
| Acm | acrylamide, a monomer | Zibo Xinye Chemical Co., LTD (Zibo City, Shandong Province, China) |
| V52 | (2,2'-azobis(2,4-dimethyl-pentanenitrile), a thermally activated polymerization initiator, obtained under the trade designation VAZO 52 | DuPont (Wilmington, DE, USA) |
| IOTG | iso-octyl thioglycolate, a chain transfer agent | Evans Chemetics (Teaneck, NJ, USA) |
| TDDM | Tertiary dodecyl mercaptan, a chain transfer agent | Sigma-Aldrich (St. Louis, MO, USA) |
| EtAc | Ethyl Acetate, a solvent | BDH Chemicals (Radnor, PA, USA) |
| PPET | Plasma treated polyethylene terephthalate (PET)backing as described in WO 2015/013387. | PET |
| DPM | Propylene glycol methyl ether ($CH_3OCH_2CHOHCH_3$, major isomer) obtained under the trade designation DOWANOL PM | Dow Chemical Company (Midland, MI, USA) |

Test Methods
Coating and Curing of Solvent PSA Samples

Additional ethyl acetate and DOWANOL PM (DPM; Dow Chemical Company, Midland, Mich.) were added as needed (as listed in Table 3) to achieve a practical viscosity for knife coating. Two PSA films approximately 1 meter in length and 12 centimeters in width were prepared by coating the solution onto 50 microns thick RF22N siliconized polyester release liner (SKC Haas, Korea) using a knife coater with a gap of 13 mils (0.33 mm). The coated samples were placed in an oven at 70° C. for 25 minutes before a top carrier layer of 50 microns thick RF02N siliconized polyester (easy) release liner (SKC Haas, Korea) was laminated to the PSA. One of the two dried PSA films was crosslinked with an electron beam with a crosslinking dose 10 megarad (MRad) at 230 kiloelectron volts (keV) accelerating voltage. A 30 centimeter (cm) length of film was cut from both the crosslinked and uncrosslinked films, the RF02N release liner was removed, and a plasma treated polyester backing was applied to the adhesive with a soft silicon roller to ensure no air bubbles were entrained, forming an adhesive sheet. This procedure was repeated for each formulation in Table 3 below.

Molecular Weight Distribution

Polymers were evaluated for their molecular weights using gel permeation chromatography (GPC). The polymer was dissolved in tetrahydrofuran at a concentration of 0.5 percent (weight/volume) and passed through a 0.2 micrometer polytetrafluoroethylene filter. Samples of the resulting solution were analyzed using a Waters Corporation (Milford, Mass., USA) GPC unit equipped with two PLgel micrometer MIXED-D columns (Styragel HRSE 7.8 millimeter (mm)× 300 mm) at 35° C. (obtained from Waters Corp., Milford, Mass., USA) and UV (Model 2487) and Refractive Index (Model 2410) detectors. Calibration was carried out using 15 polystyrene standards available from Agilent Technologies (Santa Clara, Calif.) eluted at 0.7 milliliter/minute. The weight average molecular weight (Mw) was determined and reported in kilodaltons (kDa).

Adhesive Shear Strength

Shear tests were conducted by cutting the adhesive sheet, as previously described into 12.7 mm wide adhesive tapes. A stainless-steel panel was cleaned by wiping with acetone and drying. The adhesive tapes were applied to the panel such that a 12.7 mm by 25.4 mm portion of each adhesive tape was in firm contact with the panel and one end portion of each adhesive tape was free (e.g., not attached to the panel). A 1 kilogram (kg) weight was attached to the free end of the adhesive tape sample and the panel was held in a rack so that the panel formed an angle of 180° with the extended free end and the weight. The test was conducted at approximately 23° C. and the time elapsed in minutes for each adhesive tape to separate from the test panel was recorded as shear strength. One or two shear tests were performed for each adhesive tape sample and the results averaged when two tests were performed. The test was terminated if failure had not occurred in 10,000 minutes and the result recorded as "10,000+".

Peel Adhesion Force

A stainless-steel panel was cleaned by wiping with acetone and drying. Adhesive tapes measuring 12.7 mm (0.5 inches) wide by 10 to 12 centimeters (cm) long were cut from the previously described adhesive sheet and adhered to the panel by rolling with a 2 kg (5 cm wide) hard rubber roller 2 times. The free end of the adhesive tape was doubled back so that the angle of removal was 180° and attached to the horizontal arm of an adhesion tester load cell (Slip/peel tester model 3M90, obtained from Instrumentors Inc. Strongsville, Ohio, USA). The stainless-steel plate was attached to the platform that moved at 12 inches per minute (30.5 centimeters per minute) away from the load cell. The peel test was started immediately after the adhesive tape was applied to the test panel. The load cell was read in Newtons during the test as an average of the peak and minimum forces during the peel. This number was then converted to ounces per width of the adhesive tape sample (ounces per inch, oz./in). Three peel tests were run for each sample and averaged to yield the reported peel force.

Dielectric Constant (Dk) Measurement

A nominally 4 mil (0.10 mm) thick adhesive layer (i.e. without PET backing) was prepared and e-beamed as previously described. After e-beam crosslinking, a 28 cm by 12 cm sample was cut from the adhesive sheet, the RF02N (easy) release liner was removed, and the sample was stored open-faced for >24 hours in a controlled temperature and humidity condition (CTH) room. After this time, the sample was cut in half to yield two 14 cm by 12 cm sheets which were then laminated together resulting in an 8 mil thick adhesive layer between RF22N release liners. One of the RF222 release liners was removed and replaced with a RF02N (easy) release liner.

A circular sample was then cut from the PSA using a 40 mm diameter dinking die and manual press. The RF02N (easy) release liner was then taken off the cut PSA sample. Then the sample was rolled onto a polished brass disk (diameter=40 mm, thickness=2 mm) using a small hand roller. The RF222 tight liner was then peeled off the PSA and a second PSA disk was laminated on top of the first in a similar fashion to which a second polished brass disk, of the same size, is laid on top of the exposed adhesive. The brass/(16 mil thick) PSA/brass assembly was then pressed firmly together using finger tips.

The frequency dependent dielectric measurements were performed with a Novocontrol Alpha concept temperature controlled broadband dielectric spectrometer measurement system (Novocontrol Technologies GmbH & Co. KG, Montabaur, Germany). The sample cell, Novocontrol model BDS 1200 accommodates the polished brass parallel plate PSA sandwich of 40 mm diameter. The BDS 1200 sample cell is internally interfaced to the Alpha-A mainframe. The complex permittivity (dielectric constant and loss) is computed from the phase sensitive measurement of the electrodes voltage difference (Vs) and current (Is). The Novocontrol Dielectric Spectrometer Alpha Analyzer, is designed in accordance with the ASTM D150.

Determination of Acrylate Isomer Distribution by Quantitative C-13 NMR

A solution of 150 milligrams (mg) of the alkyl acrylate, 10-15 mg of chromium(III) acetylacetonate, in 1.2 grams (g) of deuterochloroform is prepared and filtered into a 5 mm NMR tube. A quantitative C-13 NMR was obtained on a 500 MHz system Bruker Avance 3 console (Billerica, Mass.) with standard gated decoupled carbon parameters using a 10 second delay and 90 degree carbon pulse. The absorption for the methine carbon (point of attachment for the acrylate ester) was integrated and compared for 2 and 3 isomers.

Determination of Adhesive Shear Storage Modulus

The examples were analyzed by Dynamic Mechanical Analysis using a DHR-3 parallel plate rheometer (TA Instruments, Delaware, USA) to characterize the physical properties of each sample as a function of temperature. Samples were prepared by laminating layers of dried and e-beamed adhesive (i.e. without PET backing) together until a thickness between 1-1.5 mm was achieved. Samples were then punched out with an 8 mm circular die, removed from the release liner, centered between 8 mm diameter parallel plates of the rheometer, and compressed with 100-200 g of normal force. The environmental test chamber doors were shut and the oven was heated to the start temperature of 60° C. and equilibrated at that temperature for 3 minutes. The temperature was then ramped down to 0° C. at 3° C./min while the parallel plates were oscillated at an angular frequency of 1 hertz and a constant strain of 1 percent until the oscillation stress exceeded 10,000 Pa; at which point the test was switched to a constant oscillatory stress of 10,000 Pa for the remainder of the test. While many physical parameters of the material are recorded during the temperature ramp, shear storage modulus at 25° C. (G' @ 25° C.) is of primary importance in the characterization of the copolymers of this invention.

Preparative Example 1 (PE 1): Synthesis of Isomer Blend of 2-Hexyl Acrylate and 3-Hexyl Acrylate (M1)

A mixture of 971.10 g (11.54 mole (mol)) 1-hexene (Alfa Aesar, Ward Hill, Mass.), 1248.70 g (17.33 mol) acrylic acid, and 34.58 g (71 mmol) trifluoromethanesulfonic acid (Alfa Aesar) was heated to 60° C. for 24 hours. The mixture was cooled in an ice bath. A solution of 300 g of sodium hydroxide in 700 milliliters (mL) water was added slowly. The mixture was transferred to a separation funnel and the aqueous phase was removed. Ethyl acetate (1 liter (L)) was added and the mixture was washed with saturated sodium bicarbonate until the aqueous layer was basic. The organic layer was isolated and dried over $MgSO_4$, then filtered. The solvent was removed under vacuum, then the crude oil was then distilled under reduced pressure. A colorless oil fraction was collected (1248.38 g) at 42-46° C. at 6 millimeters of mercury (mmHg). The product is 76 mol % 2-hexyl acrylate and 24 mol % 3-hexyl acrylate (as determined by NMR test method).

Comparative Examples 1 TO 5 (CE-1 TO CE-5) and Examples 1 TO 6 (EX-1 TO EX-6): Preparation of Solvent Based PSA Samples For CE-1, 95.0 g of HA, 5.0 g of AA, 1.0 g of a 10 weight percent solution of V52 in EtAc, 0.40 g of a 10 weight percent solution of IOTG in EtAc, and 100 g of EtAc were added to a glass bottle. The contents were mixed and bubbled with nitrogen for 4 minutes before being sealed and placed in a Laundrometer rotating water bath (SDL Atlas, Rock Hill, S.C., USA) for 24 hours at 60° C. After 24 hours the sample was removed from the Laundrometer and cooled to ambient conditions. The sample was analyzed using GPC to determine that the Mw was 421 kDa. All further comparative examples and examples were generated in a similar manner with compositions stipulated in Table 2 below.

The solvent PSA samples were then made into tape samples according to the coating and curing of solvent PSA samples test method section above. The additional EtAc and DPM needed to prepare each tape sample is listed in Table 3. PSA tape 180° peel and shear performance results are summarized in Table 4. PSA tape dielectric measurements are summarized in Table 5.

TABLE 2

Chemical compositions of solvent PSA formulations CE-1 to CE-5 and EX-1 to EX-6

| Ex. No. | HA, g | M1, g | IBOA, g | HBA, g | HEA, g | AA, g | Acm, g | V52, g | IOTG, g | TDDM, g | EtAc, g |
|---|---|---|---|---|---|---|---|---|---|---|---|
| CE-1 | 95 | | | | | 5 | | 0.1 | 0.04 | | 100 |
| CE-2 | 95 | | | | | 5 | | 0.1 | 0.07 | | 100 |
| CE-3 | 95 | | | | | 5 | | 0.1 | | 0.09 | 100 |
| CE-4 | 95 | | | | | 5 | | 0.1 | | 0.13 | 100 |
| CE-5 | 75 | | 10 | | 15 | | | 0.1 | 0.14 | | 100 |
| EX-1 | | 95 | | | | 5 | | 0.1 | 0.04 | | 100 |
| EX-2 | | 95 | | | | 5 | | 0.1 | 0.07 | | 100 |
| EX-3 | | 95 | | | | 5 | | 0.1 | | | 100 |
| EX-4 | | 95 | | | | 5 | | 0.1 | | | 100 |
| EX-5 | | 75 | 10 | | 15 | | | 0.1 | 0.07 | | 100 |
| EX-6 | | 75 | 10 | | 15 | | | 0.1 | 0.14 | | 100 |

TABLE 3

Solvent polymer dilutions, wet coating gap, and GPC molecular weight

| Ex. No. | Coating, % Solids | EtAc added, g | DPM added, g | Gap, mil | Mw, kDa |
|---|---|---|---|---|---|
| CE-1 | 45% | 6.2 | 16 | 13 | 421 |
| CE-2 | 50% | 0 | 0 | 12 | 293 |
| CE-3 | 40% | 34 | 16 | 15 | 298 |
| CE-4 | 45% | 6.2 | 16 | 13 | 232 |
| CE-5 | 50% | 0 | 0 | 12 | 346 |
| EX-1 | 45% | 6.2 | 16 | 13 | 320 |
| EX-2 | 45% | 6.2 | 16 | 13 | 243 |
| EX-3 | 45% | 6.2 | 16 | 13 | 251 |
| EX-4 | 45% | 6.2 | 16 | 13 | 205 |
| EX-5 | 45% | 6.2 | 16 | 13 | 469 |
| EX-6 | 50% | 0 | 0 | 12 | 240 |

TABLE 4

PSA tape 180° peel and shear performance.

| Ex. No. | 10 MRad RT Peel, ounces/inch (N/dm) | 0 MRad RT Shear, minutes | 10 MRad RT Shear, minutes | G' @ 25° C. kPa |
|---|---|---|---|---|
| CE-1 | 14.4 (15.7) | 1 | 3911 | 41 |
| CE-2 | 15.4 (16.8) | 0 | 2299 | NT |
| EX-1 | 31.9 (34.8) | 22 | 7439 | 103 |
| EX-2 | 39.7 (43.3) | 12 | 1027 | NT |
| CE-3 | 16.2 (17.7) | 9 | 10000+ | NT |
| CE-4 | 16.4 (17.9) | 5 | 10000+ | NT |
| EX-3 | 28.0 (30.5) | 407 | 10000+ | 194 |
| EX-4 | 28.1 (30.6) | NT | 1019 | NT |
| CE-5 | 17.6 (19.2) | 0 | 443 | NT |
| EX-5 | 31.5 (34.3) | NT | 10000+ | 110 |
| EX-6 | 30.4 (33.1) | 13 | 6026 | NT |

*NT = not tested

In every comparison of similar composition and Mw in Table 4 above, the examples generated using M1 were observed to have significantly higher peel performance compared to the comparative examples using n-hexyl acrylate. While high shear performance is attained in both comparative examples and examples in Table 4, examples EX-5 and EX-6 that are common formulations for electronic grade optically clear adhesives, demonstrate significantly higher shear holding performance than the Comparative Example 5 utilizing n-hexyl acrylate.

TABLE 5

PSA tape dielectric measurements (Dk), values reported are an average of two independent measurements of each sample.

| Ex. No. | Dielectric constant at 100 kHz | Dielectric constant at 1 MHz |
|---|---|---|
| CE-1 | 4.60 | 4.18 |
| EX-1 | 3.98 | 3.45 |
| CE-3 | 4.58 | 4.12 |
| EX-3 | 3.94 | 3.46 |
| CE-5 | 5.51 | 4.76 |
| EX-5 | 4.55 | 3.91 |
| EX-6 | 4.58 | 3.93 |

In every comparison of similar composition in Table 5 above, the examples generated using M1 were observed to have significantly lower dielectric constant relative to the comparative examples using n-hexyl acrylate. Example 6 indicates that the dielectric constant measurement is essentially independent of sample Mw.

Examples 7 to 9 (EX-7 to EX-10) and Comparative Examples 6-9 (CE-6 to CE-9)

Adhesive tapes were prepared from compositions containing the materials and amounts shown in Table 6 as follows. The compositions were prepared by mixing 2-ethylhexyl acrylate (EHA), acrylic acid (AA), varied amounts of M1, varied amounts of HA, and 2,2-dimethoxy-2-phenylacetophenone (IRGACURE 651; BASF, Corporation, Florham Park, N.J., 0.003 g). The mixtures were purged with nitrogen for 5 minutes then exposed to an OSRAM SYLVANIA F40/350BL BLACKLIGHT (peak wavelength of 352 nanometers, 40 Watts) at a distance of 10 centimeters from the lamp with mixing until a polymeric syrup having a Brookfield viscosity of between 100 and 8000 centiPoise was formed. To the polymeric syrup thus obtained was added more IRGACURE 651 (0.017 g) and hexanediol diacrylate (HDDA, 0.015 g). These were mixed for one hour to give pre-adhesive syrup compositions. These compositions were then knife coated between a RF02N siliconized polyester release liner (SKC Haas, Korea) and the primed surface of 0.002 inch (51 micrometers) thick primed poly(ethylene terephthalate) (PET) film (HOSTAPHAN 3SAB PET film, Mitsubishi Polyester Film, Greer, S.C.) at a thickness of 0.002 inches (51 micrometers). The coated compositions were irradiated for five minutes using UVA lamps (OSRAM SYLVANIA F40/350BL BLACKLIGHT, peak wavelength of 352 nanometers, 40 Watts) to provide total UVA energy of 1050 milliJoules/square centimeter. The resulting adhesive tapes were evaluated for 180 degree angle peel adhesion strength and shear adhesion strength as described in the test methods.

TABLE 6

Compositions and Results.

| Example | EHA (grams) | AA (grams) | M1 (grams) | HA (grams) | Peel Adhesion to SS (N/dm) | Shear Adhesion to SS (min) |
|---|---|---|---|---|---|---|
| EX-7 | 7.8 | 0.2 | 2.0 | | 24.2 | 10000+ |
| EX-8 | 5.8 | 0.2 | 4.0 | | 31.6 | 10000+ |
| EX-9 | 3.8 | 0.2 | 6.0 | | 34.0 | 10000+ |
| CE-6 | 9.8 | 0.2 | | 0.0 | 17.9 | 10000+ |
| CE-7 | 7.8 | 0.2 | | 2.0 | 15.4 | 10000+ |
| CE-8 | 5.8 | 0.2 | | 4.0 | 12.3 | 10000+ |
| CE-9 | 3.8 | 0.2 | | 6.0 | 13.4 | 10000+ |

Examples 10 to 12 (EX-11 to EX-14) and Comparative Examples 10 to 13 (CE10 to CE-13)

Adhesive tapes were prepared from compositions containing the materials and amounts shown in Table 7 as follows. The compositions were prepared by mixing C12 acrylate, acrylic acid (AA), varied amounts of M1, varied amounts of HA, and 2,2-dimethoxy-2-phenylacetophenone (IRGACURE 651, 0.003 g). The mixtures were purged with nitrogen for 5 minutes then exposed to an OSRAM SYLVANIA F40/350BL BLACKLIGHT (peak wavelength of 352 nanometers, 40 Watts) at a distance of 10 centimeters from the lamp with mixing until a polymeric syrup having a Brookfield viscosity of between 100 and 8000 centiPoise was formed. To the polymeric syrup thus obtained was added more IRGACURE 651 (0.017 g) and hexanediol diacrylate (HDDA, 0.015 g). These were mixed for one hour to give pre-adhesive syrup compositions. These compositions were then knife coated between a RF02N siliconized polyester release liner (SKC Haas, Korea) and the primed surface of 0.002 inch (51 micrometers) thick primed poly (ethylene terephthalate) (PET) film (HOSTAPHAN 3SAB PET film, Mitsubishi Polyester Film, Greer, S.C.) at a thickness of 0.002 inches (51 micrometers). The coated compositions were irradiated for five minutes using UVA lamps (OSRAM SYLVANIA F40/350BL BLACKLIGHT, peak wavelength of 352 nanometers, 40 Watts) to provide total UVA energy of 1050 milliJoules/square centimeter. The resulting adhesive tapes were evaluated for 180 degree angle peel adhesion strength and shear adhesion strength as described in the test methods.

TABLE 7

Compositions and Results.

| Example | C12 acrylate (grams) | AA (grams) | M1 (grams) | HA (grams) | Peel Adhesion to SS (N/dm) | Shear Adhesion to SS (min) | G' @ 25° C. kPa |
|---|---|---|---|---|---|---|---|
| EX-10 | 7.8 | 0.2 | 2.0 |  | 19.1 | 10000+ | 36 |
| EX-11 | 5.8 | 0.2 | 4.0 |  | 25.1 | 10000+ | 45 |
| EX-12 | 3.8 | 0.2 | 6.0 |  | 27.1 | 10000+ | 53 |
| CE-10 | 9.8 | 0.2 |  | 0.0 | 18.1 | 10000+ | NT |
| CE-11 | 7.8 | 0.2 |  | 2.0 | 13.7 | 10000+ | NT |
| CE-12 | 5.8 | 0.2 |  | 4.0 | 13.6 | 388 | NT |
| CE-13 | 3.8 | 0.2 |  | 6.0 | 13.9 | 10000+ | NT |

*NT = not tested

Preparative Example 2 (PE 2): Synthesis of Isomer Blend of 2-Hexyl Acrylate and 3-Hexyl Acrylate (M2)

A mixture of 8.00 g (95 mmole) trans 3-hexene (GFS Chemicals, Powell, Ohio), 10.30 g (143 mmol) acrylic acid, and 0.50 g (3.3 mmol) trifluoromethanesulfonic acid (Alfa Aesar) was heated to 60° C. for 24 hours. The mixture was cooled to room temperature. Ethyl acetate (50 mL) was added and the mixture was washed with saturated sodium bicarbonate until the aqueous layer was basic. The organic layer was isolated and dried over $MgSO_4$, then filtered. The solvent was removed under vacuum, then the crude oil was then distilled under reduced pressure. A colorless oil fraction was collected (4.80 g) at 43-44° C. at 8 millimeters of mercury (mmHg). The product is 32 mol % 2-hexyl acrylate and 68 mol % 3-hexyl acrylate (as determined by NMR test method).

Preparative Example 3 (PE 3): Synthesis of Isomer Blend of 2-Hexyl Acrylate and 3-Hexyl Acrylate from Pre-Isomerized 1-Hexene (M3)

A mixture of 50.00 g (0.59 mol) 1-hexene, and 5.10 g AMBERLYST 15 ion exchange resin (Dow Chemical Company, Midland, Mich.) was heated to 50° C. for 48 hours. To the reaction was added 64.40 g (0.89 mol) acrylic acid and 0.30 g (2.0 mmol) trifluoromethanesulfonic acid (Alfa Aesar) and the mixture was heated to 60° C. for 24 hours. The mixture was cooled to room temperature. Ethyl acetate (50 mL) was added and the mixture was washed with saturated sodium bicarbonate until the aqueous layer was basic. The organic layer was isolated and dried over $MgSO_4$, then filtered. The solvent was removed under vacuum, then the crude oil was then distilled under reduced pressure. A colorless oil fraction was collected (20.95 g) at 44-46° C. at 8 millimeters of mercury (mmHg). The product is 51 mol % 2-hexyl acrylate and 49 mol % 3-hexyl acrylate (as determined by NMR test method).

Preparative Examples 2 and 3 can be utilized instead of Preparative Example 1 in the adhesive compositions described above.

What is claimed is:

1. A pressure-sensitive adhesive composition comprising polymerized units of secondary alkyl(meth)acrylate monomer comprising 3-hexyl acrylate and 2-hexyl acrylate, where the ratio by weight of 3-hexyl acrylate to 2-hexyl acrylate is from 10:1 and 1:10.

2. The pressure-sensitive adhesive of claim 1 wherein the secondary alkyl(meth)acrylate monomer comprises at least 10 wt.-% of polymerized units of 3-hexyl acrylate.

3. The pressure-sensitive adhesive of claim 1 wherein the pressure-sensitive adhesive further comprises polymerized units of a (meth)acrylic acid ester of a $C_1$-$C_{32}$ alkanol.

4. The pressure-sensitive adhesive of claim 1 wherein the pressure-sensitive adhesive further comprises polymerized units of an acid-functional, ethylenically unsaturated monomer.

5. The pressure-sensitive adhesive of claim 1 wherein the pressure-sensitive adhesive further comprises polymerized units of a non-acid-functional, ethylenically unsaturated polar monomer.

6. The pressure-sensitive adhesive of claim 1 wherein the pressure-sensitive adhesive further comprising a crosslinker, wherein the crosslinker is either copolymerized with the secondary alkyl(meth)acrylate monomers or is an additional component.

7. A pressure-sensitive adhesive article comprising the pressure-sensitive adhesive of claim 1 disposed on a backing.

8. The pressure-sensitive adhesive of claim 1 wherein the pressure-sensitive adhesive has a dielectric constant of less than 4 at 1 MHz.

9. The pressure-sensitive adhesive of claim 1 wherein the pressure-sensitive adhesive comprises 0 wt. % of tackifier.

10. The pressure-sensitive adhesive of claim 1 wherein the pressure-sensitive adhesive comprises less than 10 wt. % of tackifier.

* * * * *